United States Patent
Kikuchi et al.

(10) Patent No.: US 9,455,462 B2
(45) Date of Patent: Sep. 27, 2016

(54) FUEL CELL SYSTEM AND METHOD FOR DEACTIVATING FUEL CELL SYSTEM

(71) Applicant: HONDA MOTOR CO., LTD., Tokyo (JP)

(72) Inventors: Go Kikuchi, Wako (JP); Chihiro Wake, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 13/947,105

(22) Filed: Jul. 22, 2013

(65) Prior Publication Data

US 2014/0045087 A1    Feb. 13, 2014

(30) Foreign Application Priority Data

Aug. 8, 2012  (JP) ................. 2012-175954

(51) Int. Cl.
  *H01M 8/04*  (2016.01)
  *H01M 8/10*  (2016.01)

(52) U.S. Cl.
  CPC ..... *H01M 8/04955* (2013.01); *H01M 8/04223* (2013.01); *H01M 2008/1095* (2013.01); *H01M 2250/30* (2013.01); *Y02B 90/18* (2013.01); *Y02E 60/50* (2013.01)

(58) Field of Classification Search
  CPC ................ H01M 8/04955; H01M 8/04223; H01M 8/04228
  USPC ........................................ 429/429
  See application file for complete search history.

(56) References Cited

U.S. PATENT DOCUMENTS

2012/0077102 A1*  3/2012  Morita ............. H01M 8/04388
                                                            429/429

FOREIGN PATENT DOCUMENTS

JP      2003-115317    4/2003

* cited by examiner

*Primary Examiner* — Stewart Fraser
*Assistant Examiner* — Rachel L Zhang
(74) *Attorney, Agent, or Firm* — Mori & Ward, LLP

(57) ABSTRACT

In a method for deactivating a fuel cell system, low electric-power generation is performed prior to oxygen-consumption electric-power generation in a case where a state of charge in an electricity storage device provided in the fuel cell system is larger than a predetermined value when a stop switch provided in the fuel cell system is operated. After the state of charge in the electricity storage device is reduced to the predetermined value by compensating for a negative net output by discharging electricity from the electricity storage device, the oxygen-consumption electric-power generation in which oxygen remaining in a cathode system of the fuel cell is consumed to reduce oxygen concentration within the cathode system is performed.

7 Claims, 10 Drawing Sheets

FUEL CELL SYSTEM AND METHOD FOR DEACTIVATING FUEL CELL SYSTEM

CROSS-REFERENCE TO RELATED APPLICATIONS

The present application claims priority under 35 U.S.C. §119 to Japanese Patent Application No. 2012-175954, filed Aug. 8, 2012, entitled "Method for Deactivating Fuel Cell System." The contents of this application are incorporated herein by reference in their entirety.

BACKGROUND OF THE INVENTION

1. Field of the Invention

The present disclosure relates to a fuel cell system and a method for deactivating the fuel cell system.

2. Discussion of the Background

A fuel cell has an anode and a cathode and generates electric power by being supplied with hydrogen (i.e., fuel gas) to the anode and air containing oxygen (i.e., oxidant gas) to the cathode. When the electric-power generation in the fuel cell is to be stopped, if the oxygen remains in the cathode system, the cathode is known to become in a high potential state when hydrogen is supplied to the anode at the time of subsequent activation. The high potential state at the cathode is known to cause deterioration in a solid polymer electrolyte membrane that constitutes the fuel cell.

Therefore, when stopping the electric-power generation in the fuel cell, so-called oxygen-consumption electric-power generation is performed for consuming the oxygen remaining in the cathode system of the fuel cell so as to reduce the oxygen concentration in the cathode system and to set the interior of the cathode system in a nitrogen-rich state, thereby preventing the cathode from being in a high potential state at the time of subsequent activation.

For example, Japanese Unexamined Patent Application Publication No. 2003-115317 discusses a technology in which the electric-power generation in the fuel cell is stopped after setting the interior of the cathode system in a nitrogen-rich state by performing so-called exhaust-gas recirculation electric-power generation. In this exhaust-gas recirculation electric-power generation, electric power is generated by circulating air off-gas discharged from the cathode of the fuel cell to the cathode again. In this case, the oxygen-consumption electric-power generation is performed based on the exhaust-gas recirculation electric-power generation.

SUMMARY OF THE INVENTION

According to one aspect of the present invention, in a method for deactivating a fuel cell system, low electric-power generation is performed prior to oxygen-consumption electric-power generation in a case where a state of charge in an electricity storage device provided in the fuel cell system is larger than a predetermined value when a stop switch provided in the fuel cell system is operated. The electricity storage device is provided to store electricity generated in a fuel cell provided in the fuel cell system. The stop switch is provided to be operated when electric-power generation in the fuel cell is to be stopped. The low electric-power generation causes a net output to be a negative value. The net output includes a value obtained by subtracting a power consumption of an auxiliary device actuated to obtain an amount of electric power generated by the fuel cell from the amount of electric power generated by the fuel cell. After the state of charge in the electricity storage device is reduced to the predetermined value by compensating for a negative net output by discharging electricity from the electricity storage device, the oxygen-consumption electric-power generation in which oxygen remaining in a cathode system of the fuel cell is consumed to reduce oxygen concentration within the cathode system is performed.

According to another aspect of the present invention, in a method for deactivating a fuel cell system, oxygen-consumption electric-power generation in which oxygen remaining in a cathode system of a fuel cell is consumed to reduce oxygen concentration within the cathode system is performed based on variable electric-power generation in a case where a state of charge in an electricity storage device provided in the fuel cell system is larger than or equal to a first predetermined value when a stop switch provided in the fuel cell system is operated. The electricity storage device is provided to store electricity generated in the fuel cell. The stop switch is provided to be operated when electric-power generation in the fuel cell is to be stopped. The variable electric-power generation includes a first electric-power generating mode in which the electric-power generation in the fuel cell is controlled such that a net output becomes zero, a second electric-power generating mode in which the electric-power generation in the fuel cell is controlled such that the net output becomes a negative value, and a third electric-power generating mode in which the electric-power generation in the fuel cell is controlled such that the net output becomes a positive value. The net output includes a value obtained by subtracting a power consumption of an auxiliary device actuated for obtaining an amount of electric power generated by the fuel cell from the amount of electric power generated by the fuel cell. The electric-power generation is performed in the first electric-power generating mode alone or in at least two of the first to third electric-power generating modes so that the oxygen concentration within the cathode system of the fuel cell is reduced by consuming the oxygen remaining in the cathode system.

According to further aspect of the present invention, a fuel cell system includes a fuel cell, an auxiliary device, an electricity storage device, a stop switch, and a controller. The fuel cell has an anode and a cathode. The fuel cell is provided to perform electric-power generation by being supplied with fuel gas to the anode and oxidant gas to the cathode. The auxiliary device is provided to be actuated to perform the electric-power generation in the fuel cell. The electricity storage device is provided to store electricity generated in the fuel cell. The stop switch is provided to be operated when the electric-power generation in the fuel cell is to be stopped. The controller is configured to perform low electric-power generation prior to oxygen-consumption electric-power generation in a case where a state of charge in the electricity storage device is larger than a predetermined value when the stop switch is operated. The low electric-power generation causes a net output to be a negative value. The net output includes a value obtained by subtracting a power consumption of the auxiliary device actuated to obtain an amount of electric power generated by the fuel cell from the amount of electric power generated by the fuel cell. The controller is configured to perform, after the state of charge in the electricity storage device is reduced to the predetermined value by compensating for a negative net output by discharging electricity from the electricity storage device, the oxygen-consumption electric-power generation in which oxygen remaining in a cathode system of the fuel cell is consumed to reduce oxygen concentration within the cathode system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
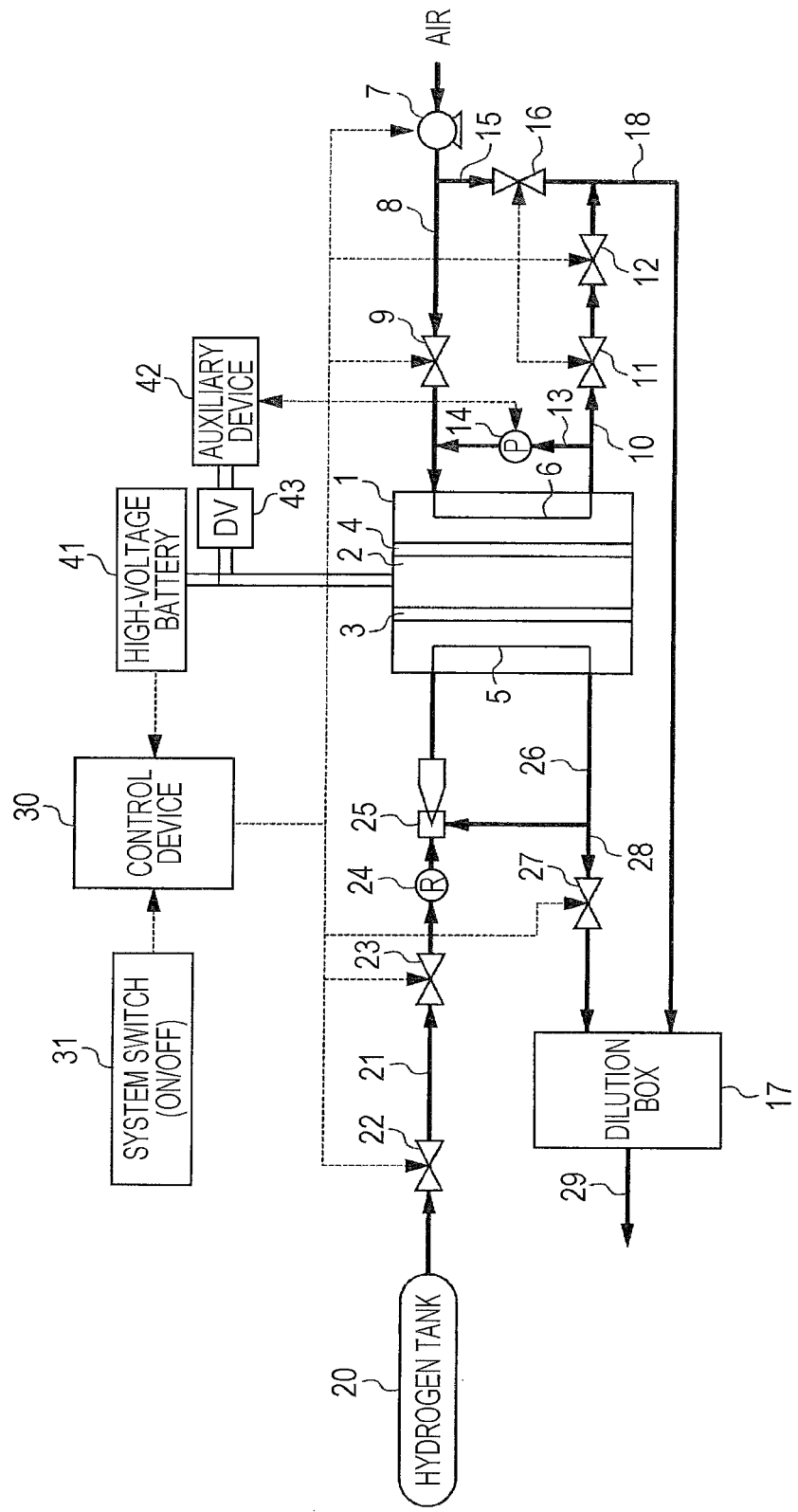
FIG. 1 schematically illustrates the configuration of a fuel cell system in which a method for deactivating a fuel cell system according to the present application can be performed.

The embodiments will now be described with reference to the accompanying drawings, wherein like reference numerals designate corresponding or identical elements throughout the various drawings.

Embodiments of a method for deactivating a fuel cell system according to the present application will be described below with reference to FIG. 1 to FIG. 10.

First, the configuration of a fuel cell system suitable for an embodiment of the present application will be described with reference to FIG. 1. The fuel cell system in this embodiment is installed in a fuel cell vehicle that obtains a driving force by driving a drive motor using electric power generated by a fuel cell.

A fuel cell 1 includes multiple cells each formed by sandwiching a solid polymer electrolyte membrane 2, such as a solid polymer ion-exchange membrane, with an anode 3 and a cathode 4 from opposite sides (only a unit cell is shown in FIG. 1 for the sake of convenience). When the anode 3 is supplied with hydrogen serving as fuel gas (i.e., reaction gas) and the cathode 4 is supplied with oxygen-containing air serving as oxidant gas (i.e., reaction gas), hydrogen ions generated by catalysis at the anode 3 move to the cathode 4 via the solid polymer electrolyte membrane 2. The hydrogen ions electrochemically react with the oxygen at the cathode 4, whereby water is produced.

Air is compressed to a predetermined pressure by a compressor 7, such as a supercharger, and is guided to an oxidant flow passage 6 within the fuel cell 1 via an air supply passage 8 and an inlet seal valve 9 so as to be supplied to the cathode 4 of each cell. After the air supplied to the fuel cell 1 is used for electric-power generation, the air is discharged as air off-gas from the fuel cell 1 to an air discharge passage 10 together with the water produced at the cathode 4. Then, the air off-gas is discharged to a dilution box 17 via an outlet seal valve 11, a pressure control valve 12, and a dilution air passage 18.

The air supply passage 8 at the downstream side of the inlet seal valve 9 and the air discharge passage 10 at the upstream side of the outlet seal valve 11 are connected to each other by an air circulation passage 13. The air circulation passage 13 is provided with a cathode circulation pump 14. By driving the cathode circulation pump 14, the air off-gas discharged to the air discharge passage 10 from the fuel cell 1 can be supplied to the oxidant flow passage 6 in the fuel cell 1 again. In other words, by driving the cathode circulation pump 14, the air off-gas can circulate toward the cathode 4 of the fuel cell 1.

A bypass passage 15 branches off from the air supply passage 8 located downstream of the compressor 7 and upstream of the inlet seal valve 9. The bypass passage 15 is connected to the dilution air passage 18. The bypass passage 15 is provided with a bypass valve 16. By opening the bypass valve 16, the air delivered from the compressor 7 can partially or entirely bypass the fuel cell 1 and flow to the dilution air passage 18.

Hydrogen supplied from a hydrogen tank 20 is guided to a fuel flow passage 5 within the fuel cell 1 via a fuel supply passage 21 so as to be supplied to the anode 3 of each cell. The fuel supply passage 21 is provided with a gas supply valve 22, a shut-off valve 23, a regulator 24, and an ejector 25 in that order from the upstream side. The hydrogen supplied from the hydrogen tank 20 is decompressed to a predetermined pressure by the regulator 24 and is supplied to the fuel flow passage 5 in the fuel cell 1. Then, unconsumed unreacted hydrogen is discharged from the fuel cell 1 as anode off-gas. The anode off-gas is suctioned into the ejector 25 via an anode off-gas passage 26, merges with fresh hydrogen supplied from the hydrogen tank 20, and is supplied to the fuel flow passage 5 in the fuel cell 1 again. In other words, the anode off-gas discharged from the fuel cell 1 circulates toward the anode 3 of the fuel cell 1 via the anode off-gas passage 26 and the fuel supply passage 21 located downstream of the ejector 25.

A purge passage 28 equipped with a purge valve 27 branches off from the anode off-gas passage 26. The purge passage 28 is connected to the dilution box 17.

The purge valve 27 is normally closed during electric-power generation in the fuel cell 1. When predetermined conditions are satisfied, the purge valve 27 opens so that impurities (such as nitrogen and water) contained in the anode off-gas are discharged to the dilution box 17 together with the anode off-gas.

The anode off-gas discharged to the dilution box 17 via the purge passage 28 is diluted by the air flowing into the dilution box 17 via the dilution air passage 18. Then, the diluted gas is discharged from the dilution box 17 to the atmosphere via an exhaust pipe 29.

The fuel cell 1 is connected to a drive motor (not shown) and a high-voltage battery (i.e. electricity storage unit) 41 and is also connected to an auxiliary device 42 of the fuel cell system via a downverter 43. The fuel cell 1 is capable of charging the high-voltage battery 41 with the electricity generated in the fuel cell 1 and is also capable of supplying electric power to the drive motor and the auxiliary device 42. In addition, when the amount of electricity generated in the fuel cell 1 is small, the fuel cell 1 can compensate for the shortage by receiving electric power from the high-voltage battery 41 so as to drive the drive motor and the auxiliary device 42. Although the compressor 7, the cathode circulation pump 14, and the auxiliary device 42 are shown separately in FIG. 1 for illustrative purposes, the compressor 7 and the cathode circulation pump 14 constitute a part of the auxiliary device 42. The auxiliary device 42 also includes a coolant pump and a cooling fan, which are not shown, for cooling the fuel cell 1.

A control device 30 is connected to a system switch 31 that is to be operated by a user when activating (ON) or deactivating (OFF) the fuel cell system. The control device 30 controls activation and deactivation of the fuel cell system on the basis of an ON/OFF signal input from the system switch 31, and also performs output control of the fuel cell 1, such as controlling of the auxiliary device 42 including the compressor 7 and the cathode circulation pump 14, the inlet seal valve 9, the outlet seal valve 11, the pressure control valve 12, the bypass valve 16, the gas supply valve 22, the shut-off valve 23, and the purge valve 27, depending on the control contents.

In the fuel cell system having the above-described configuration, when the system switch 31 is turned off, oxygen-consumption electric-power generation is performed before stopping the electric-power generation in the fuel cell 1 so as to reduce the oxygen concentration by consuming the oxygen remaining in the cathode system of the fuel cell 1 while continuing the supply of hydrogen gas to the fuel cell 1. By performing the oxygen-consumption electric-power generation, the oxygen concentration within the cathode system is set close to zero so that the cathode 4 is prevented from being in a high potential state at the time of subsequent activation of the fuel cell system, thus preventing deterioration of the solid polymer electrolyte membrane 2 of the fuel cell 1.

The oxygen-consumption electric-power generation can be performed based on, for example, cathode circulation electric-power generation or oxygen-lean electric-power generation. Specifically, cathode circulation electric-power generation is a method for generating electric power while circulating the air off-gas by closing the outlet seal valve 11 and driving the cathode circulation pump 14. Cathode circulation electric-power generation can be performed regardless of whether the inlet seal valve 9 is in an open state or a closed state. Oxygen-lean electric-power generation is an electric-power generating method in which the amount of air supplied to the fuel cell 1 is smaller than that in normal electric-power generation. In other words, oxygen-lean electric-power generation is an electric-power generating method in which the air stoichiometry is lower than that in normal electric-power generation so that the interior of the fuel cell 1 and the interior of the air discharge passage 10 are set in a nitrogen-rich state (i.e., an atmosphere with sufficiently low oxygen concentration).

In embodiments to be described below, the oxygen-consumption electric-power generation is performed based on cathode circulation electric-power generation.

First Embodiment

Next, a method for deactivating a fuel cell system according to a first embodiment will be described.

An amount of electric power generated in the fuel cell 1 will be defined as a gross output W1, a consumed electric power by the auxiliary device 42 actuated for obtaining the gross output W1 will be defined as W2, and an electric power obtained by subtracting the consumed electric power W2 of the auxiliary device 42 from the gross output W1 of the fuel cell 1 will be defined as a net output W3 of the fuel cell 1 (W3=W1−W2).

In the cathode circulation electric-power generation performed as the oxygen-consumption electric-power generation, the supply of reaction gases (i.e., hydrogen and air) is controlled such that the net output W3 becomes a positive value. Therefore, during the cathode circulation electric-power generation performed as the oxygen-consumption electric-power generation, the net output W3, which is a positive value, is stored into the high-voltage battery 41.

In order to achieve the intended purpose of the oxygen-consumption electric-power generation, the oxygen concentration within the cathode system of the fuel cell 1 needs to be reduced to a predetermined value upon completion of the cathode circulation electric-power generation performed as the oxygen-consumption electric-power generation. Therefore, when the oxygen-consumption electric-power generation is to be commenced, the state of charge in the high-voltage battery 41 needs to provide enough capacity at least for the amount of electricity (i.e., the aforementioned positive net output W3) to be stored into the high-voltage battery 41 during the oxygen-consumption electric-power generation. In other words, when the oxygen-consumption electric-power generation is to be commenced, the high-voltage battery 41 needs to have free capacity (referred to as "required free capacity" hereinafter) that corresponds to a total positive net output W3 to be generated by the oxygen-consumption electric-power generation.

The aforementioned required free capacity can be theoretically calculated from the amount of oxygen remaining in the cathode system of the fuel cell 1 at the time of commencement of the oxygen-consumption electric-power generation. The amount of oxygen remaining in the cathode system of the fuel cell 1 at the time of commencement of the oxygen-consumption electric-power generation is known in advance from the hardware configuration of the fuel cell system. Therefore, by determining the hardware configuration of the fuel cell system, the required free capacity can be set in advance.

In the first embodiment, a predetermined value A (%) obtained by subtracting the required free capacity from an upper limit value B (%) for the SOC in the high-voltage battery 41 is set as an SOC reference value. If the SOC in the high-voltage battery 41 is larger than the predetermined value A when the control device 30 receives an OFF signal from the system switch 31, a process for reducing the SOC in the high-voltage battery 41 to the predetermined value A is performed before the oxygen-consumption electric-power generation is performed. The upper limit value B is set to a predetermined value in view of the durability of the high-voltage battery 41.

The SOC in the high-voltage battery 41 is reduced to the predetermined value A by performing low electric-power generation for obtaining a negative net output W3 in the fuel cell 1. This negative net output W3 is compensated for by electricity discharged from the high-voltage battery 41 so that the SOC in the high-voltage battery 41 is reduced to the predetermined value A. This can prevent wasteful operation of the auxiliary device 42 that originally does not need to be actuated but consumes electric power solely for reducing the SOC in the high-voltage battery 41.

The low electric-power generation can be performed by reducing the stoichiometry of air or hydrogen or by reducing the pressure of these reaction gases. The low electric-power generation according to the first embodiment is performed with lower air stoichiometry than that in normal electric-power generation by driving the compressor 7 at low rotation speed and using air passages that are the same as those used in normal electric-power generation. The cathode circulation pump 14 may be driven or not driven.

If the SOC in the high-voltage battery 41 is below the predetermined value A when the control device 30 receives an OFF signal from the system switch 31, the oxygen-consumption electric-power generation is performed after increasing the SOC in the high-voltage battery 41 to the predetermined value A by performing off-state charging based on normal electric-power generation. In this case, the low electric-power generation is not performed.

Figure 2:
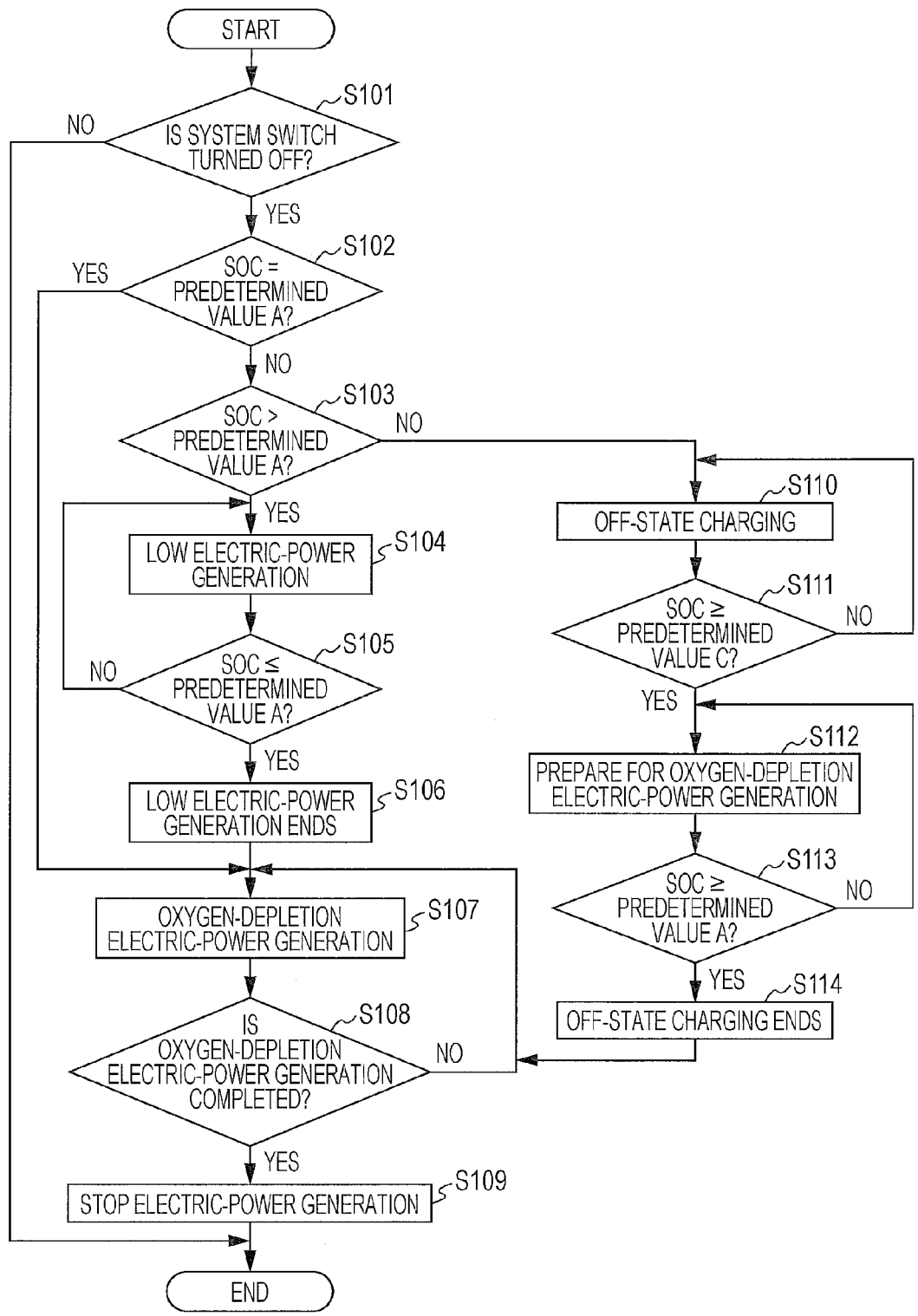
FIG. 2 is a flowchart illustrating fuel-cell-system deactivation control according to a first embodiment.

Next, fuel-cell-system deactivation control according to the first embodiment will be described with reference to a flowchart in FIG. 2. A fuel-cell-system deactivation control routine shown in the flowchart in FIG. 2 is performed by the control device 30.

First, in step S101, it is determined whether or not the system switch 31 is turned off.

If the determination result in step S101 indicates "NO", the routine ends since there is no need to deactivate the fuel cell system.

If the determination result in step S101 indicates "YES", the routine proceeds to step S102 where it is determined whether or not the SOC in the high-voltage battery 41 is equal to the predetermined value A (%). In this case, the predetermined value A is a value corresponding to an SOC obtained by subtracting the required free capacity from the upper limit value B for the high-voltage battery 41, as described above.

If the determination result in step S102 indicates "NO" (SOC≠A), the routine proceeds to step S103 where it is determined whether or not the SOC in the high-voltage battery 41 is larger than the predetermined value A (%).

If the determination result in step S103 indicates "YES" (SOC>A), the routine proceeds to step S104 where low electric-power generation is performed.

In the low electric-power generation according to the first embodiment, low-pressure air is supplied at a low flow rate to the cathode 4 of the fuel cell 1 by opening the inlet seal valve 9, the outlet seal valve 11, and the pressure control valve 12 and driving the compressor 7 at low rotation speed, so that the air stoichiometry is lower than that in normal electric-power generation. By generating electric power in this state, the net output W3 of the fuel cell 1 becomes a negative value. In this case, this negative net output W3 is compensated for by electricity discharged from the high-voltage battery 41 so that the net output W3 can be maintained in a negative electric-power generation state, whereby the SOC in the high-voltage battery 41 can be reduced.

When the cathode 4 of the fuel cell 1 is to be supplied with air at a flow rate that is lower than the minimal flow rate of the compressor 7, the bypass valve 16 is opened. Accordingly, the air stoichiometry can be further reduced.

The routine proceeds from step S104 to step S105 where it is determined whether or not the SOC in the high-voltage battery 41 is smaller than or equal to the predetermined value A.

If the determination result in step S105 indicates "NO" (SOC>A), the routine returns to step S104 so as to continue with the low electric-power generation.

If the determination result in step S105 indicates "YES" (SOC≤A), the routine proceeds to step S106 where the low electric-power generation ends. The routine further proceeds to step S107 where cathode circulation electric-power generation is performed as the oxygen-consumption electric-power generation.

As described above, in the first embodiment, cathode circulation electric-power generation is performed as the oxygen-consumption electric-power generation. In the cathode circulation electric-power generation performed as the oxygen-consumption electric-power generation, the outlet seal valve 11 is closed and the bypass valve 16 is opened while the inlet seal valve 9 is left open, and the cathode circulation pump 14 and the compressor 7 are driven. In the cathode circulation electric-power generation, the air stoichiometry is controlled such that the net output W3 of the fuel cell 1 becomes a positive value. By performing the cathode circulation electric-power generation by opening the inlet seal valve 9, fresh air is introduced by an amount equivalent to the amount of oxygen consumed within the fuel cell 1. Thus, the nitrogen concentration is high upon completion of the oxygen-consumption electric-power generation so that the interior of the cathode system of the fuel cell 1 can be set to a positive pressure.

Subsequently, the routine proceeds to step S108 where it is determined whether or not the oxygen-consumption electric-power generation has been completed. Specifically, for example, an oxygen sensor may be used to detect the oxygen concentration within the cathode system, and it may be determined that the oxygen-consumption electric-power generation has been completed when the oxygen concentration reaches a predetermined value or lower. Alternatively, it may be determined that the oxygen-consumption electric-power generation has been completed when the duration of the oxygen-consumption electric-power generation reaches a predetermined time set in advance. As another alternative, the discharge electric current output from the fuel cell 1 during the oxygen-consumption electric-power generation may be integrated, and it may be determined that the oxygen-consumption electric-power generation has been completed when the integrated value reaches a predetermined integrated electric current value.

If the determination result in step S108 indicates "NO", the routine returns to step S107 so as to continue with the oxygen-consumption electric-power generation.

If the determination result in step S108 indicates "YES", the routine proceeds to step S109 where a process for stopping the electric-power generation in the fuel cell 1 is performed, and the routine ends. The process for stopping the electric-power generation in the fuel cell 1 includes deactivating the compressor 7 and the cathode circulation pump 14 and closing the inlet seal valve 9, the outlet seal valve 11, the gas supply valve 22, the shut-off valve 23, and the purge valve 27. By closing the inlet seal valve 9 and the outlet seal valve 11, the interior of the cathode system of the fuel cell 1 can be set to a positive pressure. Thus, air (oxygen) can be prevented from entering the cathode system of the fuel cell 1 when the fuel cell system is in a deactivated state.

On the other hand, if the determination result in step S103 indicates "NO" (SOC<A), the routine proceeds to step S110 where off-state charging is performed. The off-state charging involves controlling the supply of the reaction gases (i.e., hydrogen and oxygen) as in normal electric-power generation so as to obtain a positive net output W3 in the fuel cell 1, and storing the positive net output W3 into the high-voltage battery 41. The net output W3 in the off-state charging is larger than the net output W3 in the oxygen-consumption electric-power generation. Accordingly, the amount of electricity stored into the high-voltage battery 41 per hour is larger in the off-state charging than in the oxygen-consumption electric-power generation.

Subsequently, the routine proceeds to step S111 where it is determined whether or not the SOC in the high-voltage battery 41 is larger than or equal to a predetermined value C. The predetermined value C is a value slightly smaller than the predetermined value A (C<A).

If the determination result in step S111 indicates "NO" (SOC<C), the routine returns to step S110 so as to continue with the off-state charging.

If the determination result in step S111 indicates "YES" (SOC≥C), the routine proceeds to step S112 where preparation for oxygen-consumption electric-power generation is performed while the off-state charging is continuously performed. In this case, the preparation for oxygen-consumption electric-power generation includes reducing the hydrogen pressure at the anode 3 side of the fuel cell 1 and performing a dilution process.

The dilution process performed as the preparation for oxygen-consumption electric-power generation is as follows. Although the oxygen-consumption electric-power generation is performed by supplying hydrogen gas to the fuel cell 1, there is a possibility that the dilution box 17 performing the dilution cannot keep up with the overall process because the amount of air supplied from the compressor 7 is small. As preparation for oxygen-consumption electric-power generation, a dilution process of opening the bypass valve 16 to send a large amount of air to the dilution box 17 in advance is desirably performed.

The routine proceeds from step S112 to step S113 where it is determined whether or not the SOC in the high-voltage battery 41 is larger than or equal to the predetermined value A.

If the determination result in step S113 indicates "NO" (SOC<A), the routine returns to step S112.

If the determination result in step S113 indicates "YES" (SOC≥A), the routine proceeds to step S114 where the off-state charging ends.

Subsequently, the routine proceeds from step S114 to step S107 where oxygen-consumption electric-power generation is performed. Accordingly, the preparation for oxygen-consumption electric-power generation is concurrently performed before the off-state charging ends so that oxygen-consumption electric-power generation can be performed immediately upon completion of the off-state charging, whereby the time required for the deactivation process can be shortened.

If the determination result in step S102 indicates "YES", the routine proceeds to step S107 where oxygen-consumption electric-power generation is performed. In other words, if the determination result in step S102 indicates "YES", there is no need to charge the high-voltage battery 41 with electricity or discharge electricity therefrom since the SOC in the high-voltage battery 41 is equal to the predetermined value A. Therefore, oxygen-consumption electric-power generation is immediately performed without performing low electric-power generation and off-state charging.

Figure 3:
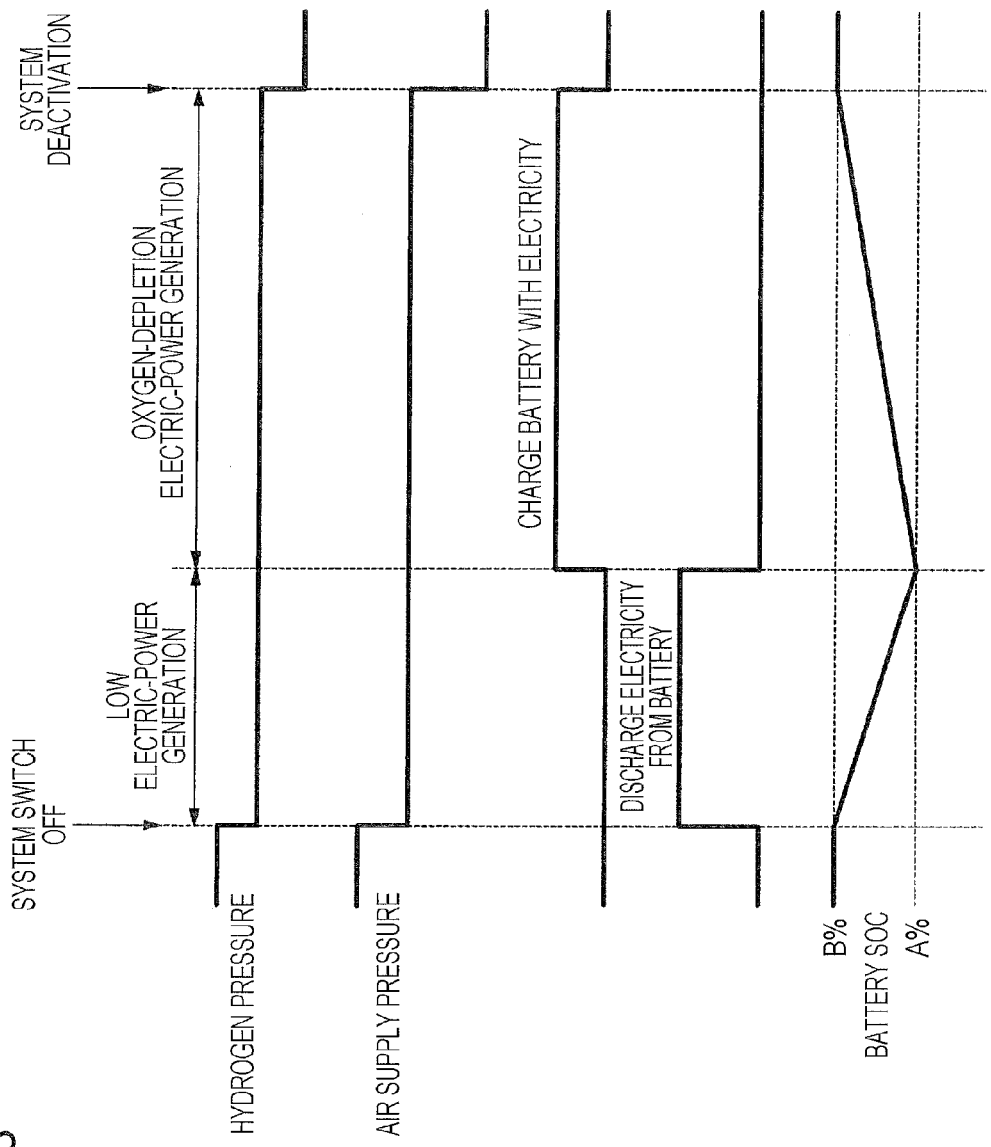
FIG. 3 is a timing chart for a state of charge (sometimes abbreviated as "SOC" hereinafter) in a battery when the fuel-cell-system deactivation control according to the first embodiment is performed in a state where the SOC in the battery is equal to an upper limit value B.

FIG. 3 is a timing chart from when the system switch 31 is turned off to when the system is deactivated (i.e., electric-power generation in the fuel cell 1 is stopped) in a case where the SOC in the high-voltage battery 41 is equal to the upper limit value B (i.e., when the determination result in step S103 indicates "YES"). In this case, when the system switch 31 is turned off, low electric-power generation is performed. During the low electric-power generation, the high-voltage battery 41 discharges electricity so that the SOC therein gradually decreases. When the SOC in the high-voltage battery 41 reaches the predetermined value A, the low electric-power generation ends and oxygen-consumption electric-power generation commences. With the transition from the low electric-power generation to the oxygen-consumption electric-power generation, the high-voltage battery 41 changes from the discharge mode to a charge mode. During the oxygen-consumption electric-power generation, the high-voltage battery 41 is charged with electricity so that the SOC in the high-voltage battery 41 gradually increases. Upon completion of the oxygen-consumption electric-power generation, the oxygen concentration within the cathode system of the fuel cell 1 is reduced to a predetermined value and the interior of the cathode system is in a nitrogen-rich state. At this time, the SOC in the high-voltage battery 41 is substantially equal to the upper limit value B.

Figure 4:
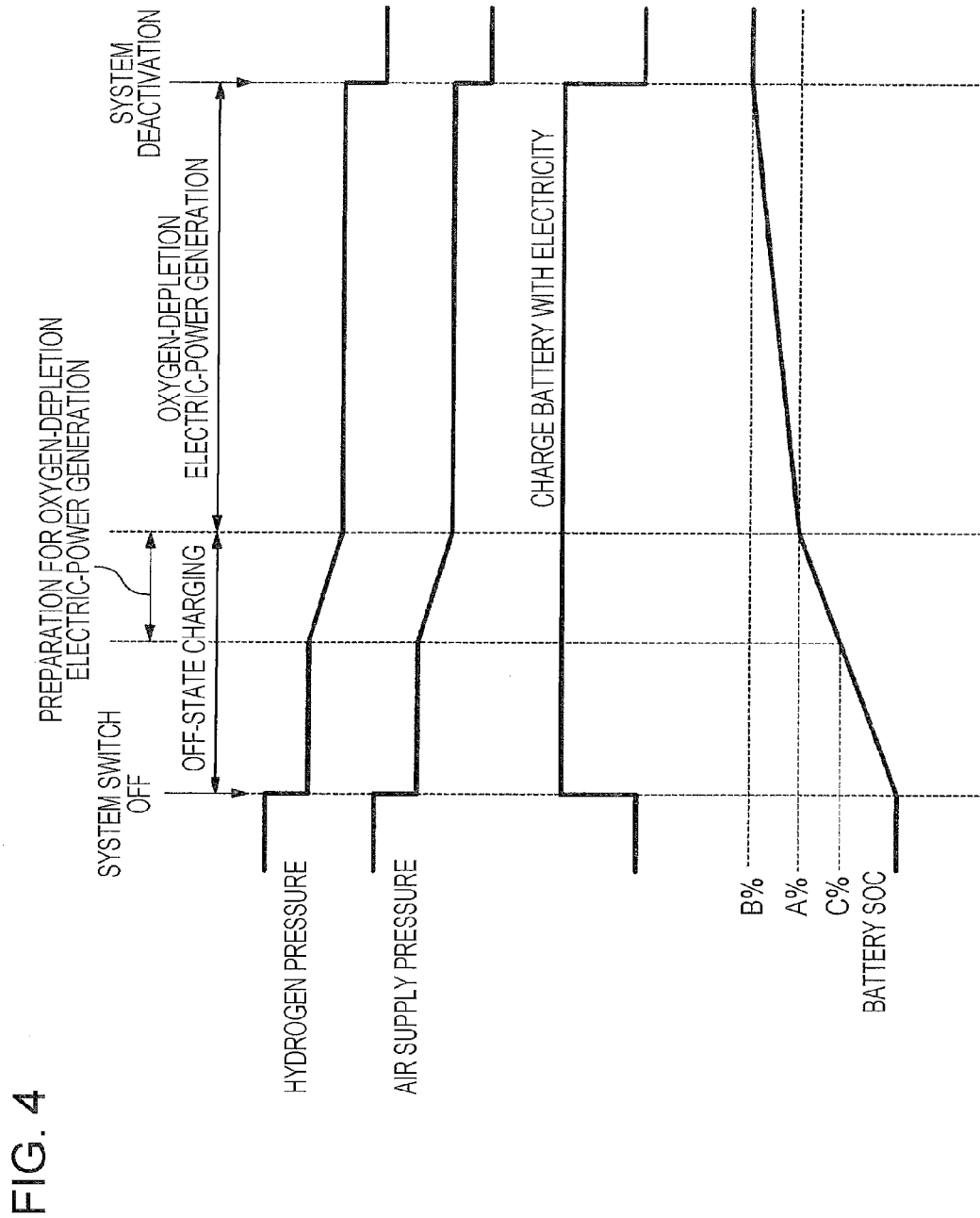
FIG. 4 is a timing chart for the SOC in the battery when the fuel-cell-system deactivation control according to the first embodiment is performed in a state where the SOC in the battery is smaller than a predetermined value A.

FIG. 4 is a timing chart from when the system switch 31 is turned off to when the system is deactivated in a case where the SOC in the high-voltage battery 41 is smaller than the predetermined value A (i.e., when the determination result in step S103 indicates "NO"). In this case, when the system switch 31 is turned off, off-state charging is performed. During the off-state charging, the high-voltage battery 41 is charged with electricity so that the SOC in the high-voltage battery 41 gradually increases. When the SOC in the high-voltage battery 41 reaches the predetermined value C, preparation for oxygen-consumption electric-power generation is performed. Moreover, when the SOC in the high-voltage battery 41 reaches the predetermined value A, the off-state charging ends and oxygen-consumption electric-power generation commences. The high-voltage battery 41 is continuously charged with electricity during the oxygen-consumption electric-power generation so that the SOC in the high-voltage battery 41 gradually increases. Then, upon completion of the oxygen-consumption electric-power generation, the oxygen concentration within the cathode system of the fuel cell 1 is reduced to a predetermined value and the interior of the cathode system is in a nitrogen-rich state. At this time, the SOC in the high-voltage battery 41 is substantially equal to the upper limit value B. By performing the preparation for oxygen-consumption electric-power generation immediately before the off-state charging ends, the hydrogen pressure and the air supply pressure are adjusted to pressure values suitable for oxygen-consumption electric-power generation.

Figure 5:
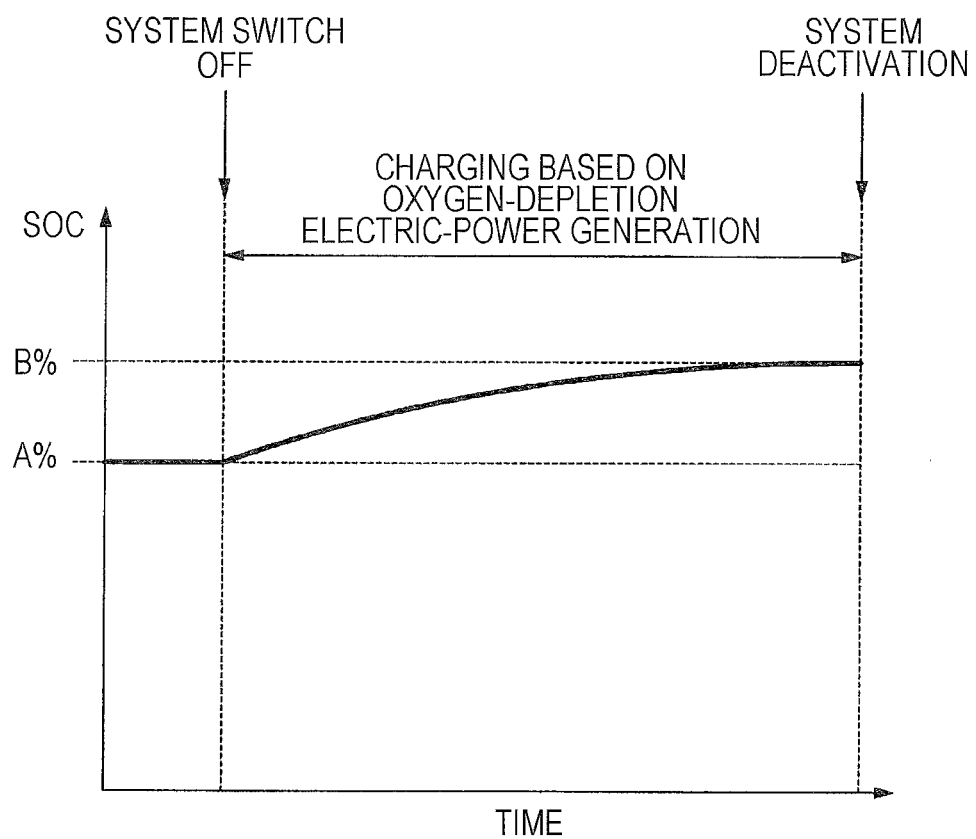
FIG. 5 is a timing chart for the SOC in the battery when the fuel-cell-system deactivation control according to the first embodiment is performed in a state where the SOC in the battery is equal to the predetermined value A.

FIG. 5 is an SOC timing chart from when the system switch 31 is turned off to when the system is deactivated in a case where the SOC in the high-voltage battery 41 is equal to the predetermined value A (i.e., when the determination result in step S102 indicates "YES"). In this case, when the system switch 31 is turned off, oxygen-consumption electric-power generation is immediately performed. In this case, neither off-state charging nor low electric-power generation is performed.

In the first embodiment described above, the low electric-power generation performed in step S104 in the case where the SOC in the high-voltage battery 41 is larger than the predetermined value A when the system switch 31 is turned off is controlled such that the net output W3 of the fuel cell 1 is constantly a negative value during the low electric-power generation. However, the control performed in the low electric-power generation is not limited to the above.

Figure 6:
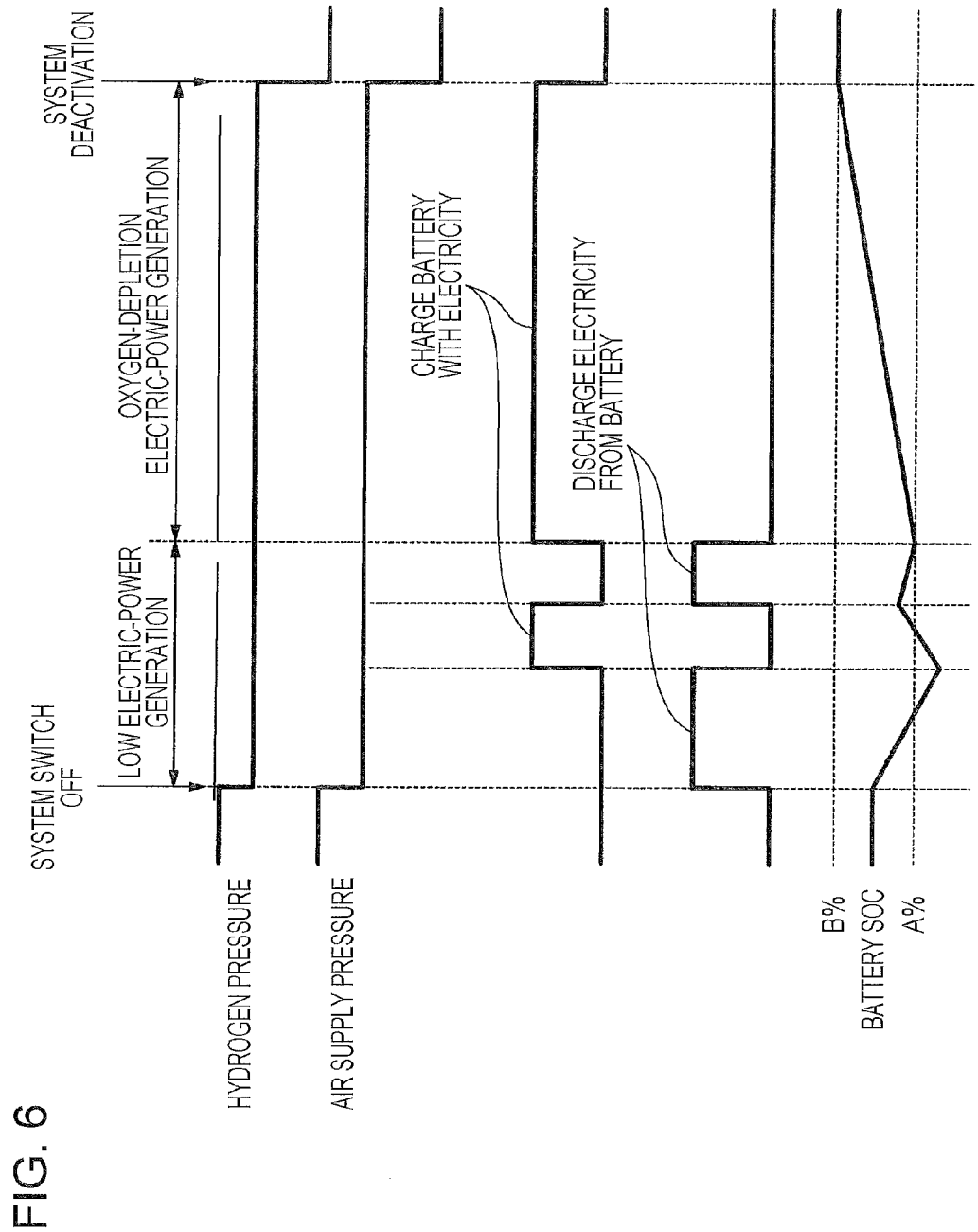
FIG. 6 is a timing chart for the SOC in the battery when the fuel-cell-system deactivation control according to the first embodiment is performed in a state where the SOC in the battery is smaller than the upper limit value B but larger than the predetermined value A.

For example, as shown in a timing chart in FIG. 6, during the low electric-power generation, the electric-power generation in the fuel cell 1 may be controlled by performing a combination of electric-power generation for obtaining a positive net output W3 and electric-power generation for obtaining a negative net output W3 such that the SOC in the high-voltage battery 41 is set to the predetermined value A (i.e., a kind of variable electric-power generation, to be described later). Specifically, in this case, when the entire period in which the low electric-power generation is performed is viewed comprehensively, it can be considered that "the electric-power generation in the fuel cell 1 is controlled such that the net output W3 becomes a negative value". Accordingly, if the SOC in the high-voltage battery 41 decreases to a value lower than the predetermined value A as a result of excessively performing electric-power generation for obtaining a negative net output W3 due to an effect of, for example, disturbance, electric-power generation for obtaining a positive net output W3 is performed so that the SOC in the high-voltage battery 41 can be set to the predetermined value A. In order to perform the electric-power generation for obtaining a positive net output W3 in the low electric-power generation, the amount of supplied air may be increased by increasing the rotation speed of the compressor 7.

FIG. 6 is a timing chart from when the system switch 31 is turned off to when the system is deactivated in a case where the SOC in the high-voltage battery 41 is smaller than the upper limit value B but larger than the predetermined value A (i.e., when the determination result in step S103 indicates "YES"). In FIG. 6, when the net output W3 of the fuel cell 1 becomes a negative value during the low electric-power generation, the high-voltage battery 41 discharges electricity by an amount equivalent to the negative value. When the net output W3 of the fuel cell 1 is a positive value, the high-voltage battery 41 is charged with an amount of electricity equivalent to the positive value. When the SOC in the high-voltage battery 41 reaches the predetermined value A, the low electric-power generation ends and oxygen-consumption electric-power generation commences.

In the method for deactivating the fuel cell system according to the first embodiment, if the SOC in the high-voltage battery 41 is larger than the predetermined value A when the system switch 31 is turned off, low electric-power generation is performed before oxygen-consumption electric-power generation is performed, so that the SOC in the high-voltage battery 41 is reduced to the predetermined value A. Subsequently, oxygen-consumption electric-power generation is performed. Therefore, before the oxygen concentration within the cathode system is sufficiently reduced by consuming the oxygen remaining within the cathode system of the fuel cell 1 by performing oxygen-consumption electric-power generation, the capacity available in the high-voltage battery 41 that is to be charged with electricity can be ensured as free capacity in the high-voltage battery 41 prior to the commencement of oxygen-consumption electric-power generation. As a result, when the oxygen-consumption electric-power generation is performed, the oxygen concentration within the cathode system of the fuel cell 1 can be sufficiently reduced, so that the electric-power generation in the fuel cell 1 can be stopped in a state where the oxygen concentration within the cathode system has been sufficiently reduced. Therefore, the cathode 4 can be reliably prevented from being in a high potential state at the time of subsequent activation of the fuel cell system. Consequently, deterioration of the solid polymer electrolyte membrane 2 of the fuel cell 1 can be prevented.

In addition, the state of charge in the high-voltage battery 41 can be reduced to the predetermined value A without wasteful operation of the auxiliary device 42 that originally does not need to be actuated but consumes electric power solely for reducing the state of charge in the high-voltage battery 41. Thus, a sense of discomfort felt by the user due to unnecessary actuation of the auxiliary device 42, deterioration in the durability of the auxiliary device 42 caused by an increased operating time, misoperation of the fuel cell system caused by unexpected actuation of the auxiliary device 42, and the like can be suppressed.

If there is a device that is not directly involved with the electric-power generation in the fuel cell 1 but is to be driven when the low electric-power generation is being performed, the operation of such a device is not hindered. By supplying electric power to the device from the high-voltage battery 41, the SOC in the high-voltage battery 41 can be quickly reduced to the predetermined value A.

Second Embodiment

Next, a method for deactivating a fuel cell system according to a second embodiment of the present application will be described.

In the method for deactivating the fuel cell system according to the first embodiment, the net output W3 of the fuel cell 1 is constantly a positive value in the cathode circulation electric-power generation performed as the oxygen-consumption electric-power generation. Therefore, it is necessary to ensure the required free capacity in the high-voltage battery 41 before commencing the oxygen-consumption electric-power generation. In order to achieve this, low electric-power generation is performed so as to reduce the SOC in the high-voltage battery 41 to the predetermined value A.

In contrast, in the second embodiment, the cathode circulation electric-power generation performed as the oxygen-consumption electric-power generation is based on variable electric-power generation so that the low electric-power generation in the first embodiment is omitted.

In this case, variable electric-power generation is an electric-power generating method that includes a first electric-power generating mode in which the electric-power generation in the fuel cell 1 is controlled such that the net output W3 of the fuel cell 1 becomes zero, a second electric-power generating mode in which the electric-power generation in the fuel cell 1 is controlled such that the net output W3 of the fuel cell 1 becomes a negative value, and a third electric-power generating mode in which the electric-power generation in the fuel cell 1 is controlled such that the net output W3 of the fuel cell 1 becomes a positive value.

When this variable electric-power generation is performed in the first electric-power generating mode, the net output W3 of the fuel cell 1 becomes zero so that the high-voltage battery 41 does not discharge electricity therefrom or is not charged with electricity. Therefore, when electric power is generated in the first electric-power generating mode, the SOC in the high-voltage battery 41 does not change.

When the variable electric-power generation is performed in the second electric-power generating mode, the net output W3 of the fuel cell 1 becomes a negative value so that the negative value is compensated for by electricity discharged from the high-voltage battery 41. Therefore, when electric power is generated in the second electric-power generating mode, the SOC in the high-voltage battery 41 decreases.

When the variable electric-power generation is performed in the third electric-power generating mode, the net output W3 of the fuel cell 1 becomes a positive value so that the positive value is stored into the high-voltage battery 41. Therefore, when electric power is generated in the second electric-power generating mode, the SOC in the high-voltage battery 41 increases.

In the case where the cathode circulation electric-power generation performed as the oxygen-consumption electric-power generation is based on variable electric-power generation, the oxygen concentration within the cathode system of the fuel cell 1 can be reduced while freely controlling the SOC in the high-voltage battery 41. In addition, the SOC in the high-voltage battery 41 can be freely controlled during and upon completion of the oxygen-consumption electric-power generation.

When the variable electric-power generation is performed in the second electric-power generating mode, the amount of circulating air off-gas with low oxygen concentration is increased by increasing the rotation speed of the cathode circulation pump 14, and the amount of fresh air supplied to the fuel cell 1 is reduced by decreasing the rotation speed of the compressor 7. Thus, the air stoichiometry can be reduced, whereby a negative net output W3 can be obtained in the fuel cell 1. An alternative method for obtaining a negative net output W3 includes reducing the supply pressure of air.

When the variable electric-power generation is performed in the third electric-power generating mode, the amount of circulating air off-gas with low oxygen concentration is reduced by decreasing the rotation speed of the cathode circulation pump 14, and the amount of fresh air supplied to the fuel cell 1 is increased by increasing the rotation speed of the compressor 7. Accordingly, fresh air is introduced by an amount equivalent to the amount of oxygen consumed within the fuel cell 1 so that the air stoichiometry can be increased, whereby a positive net output W3 can be obtained in the fuel cell 1. An alternative method for obtaining a positive net output W3 includes increasing the air supply pressure.

When the variable electric-power generation is performed in the first electric-power generating mode, the rotation speeds of the cathode circulation pump 14 and the compressor 7 are adjusted to intermediate rotation speeds between the second electric-power generating mode and the third electric-power generating mode described above. Accordingly, a zero net output W3 can be obtained in the fuel cell 1.

Figure 7:
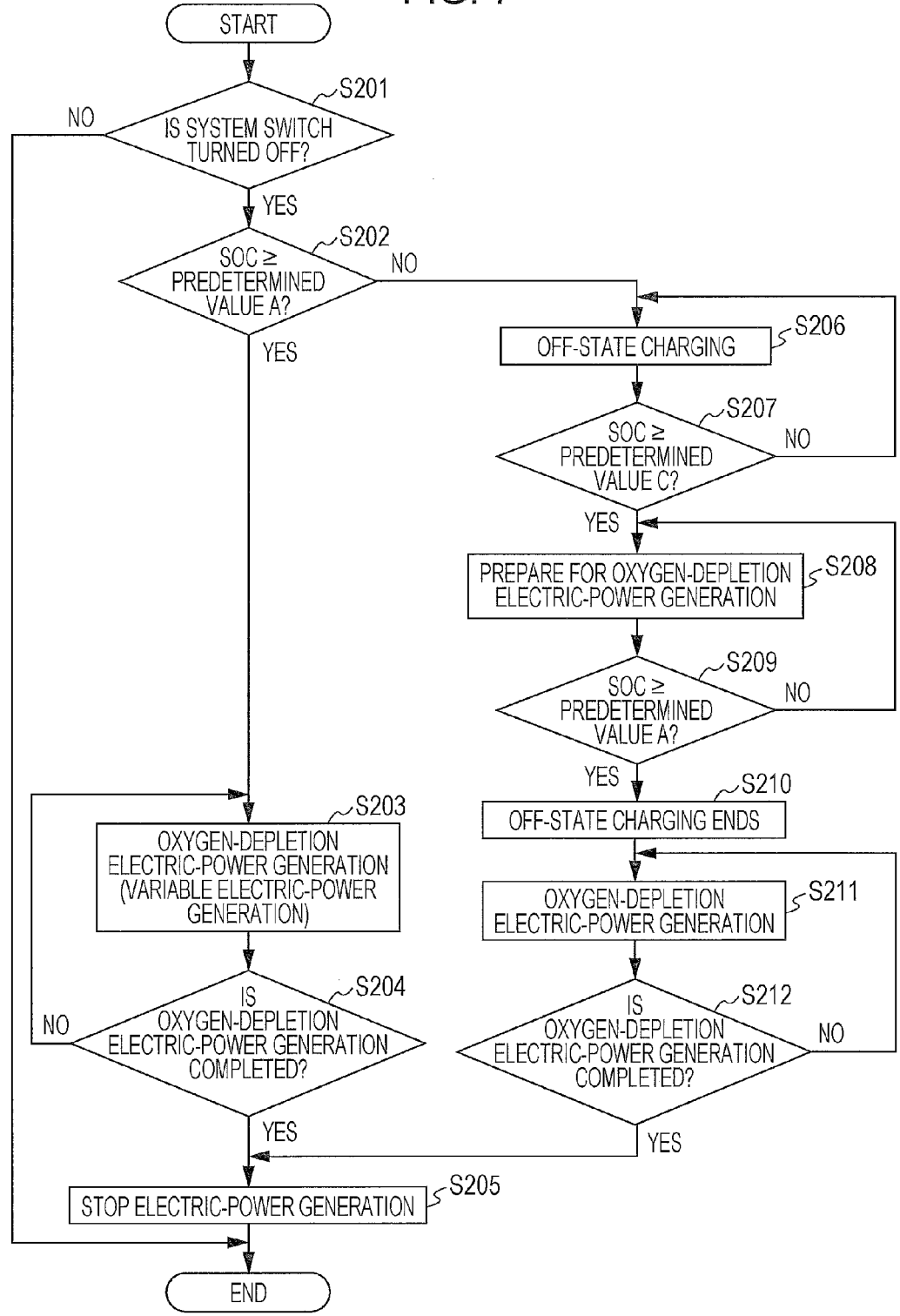
FIG. 7 is a flowchart illustrating fuel-cell-system deactivation control according to a second embodiment.

Next, fuel-cell-system deactivation control according to the second embodiment will be described with reference to a flowchart in FIG. 7. A fuel-cell-system deactivation control routine shown in the flowchart in FIG. 7 is performed by the control device 30.

First, in step S201, it is determined whether or not the system switch 31 is turned off.

If the determination result in step 201 indicates "NO", the routine ends since there is no need to deactivate the fuel cell system.

If the determination result in step S201 indicates "YES", the routine proceeds to step S202 where it is determined whether or not the SOC in the high-voltage battery 41 is larger than or equal to a predetermined value A (%). In this case, the predetermined value A is the same as the predetermined value A in the first embodiment and is a value corresponding to an SOC obtained by subtracting the required free capacity from an upper limit value B (%) for the high-voltage battery 41.

If the determination result in step S202 indicates "YES" (SOC≥A), the routine proceeds to step S203 where cathode circulation electric-power generation is performed as oxygen-consumption electric-power generation based on variable electric-power generation.

In this case, the cathode circulation electric-power generation performed as the oxygen-consumption electric-power generation is similar to the cathode circulation electric-power generation performed as the oxygen-consumption electric-power generation in the first embodiment in that the outlet seal valve 11 is closed and the bypass valve 16 is opened while the inlet seal valve 9 is left open, and that the cathode circulation pump 14 and the compressor 7 are driven. However, in contrast to the cathode circulation electric-power generation performed as the oxygen-consumption electric-power generation in the first embodiment in which the net output W3 is constantly a positive value, the cathode circulation electric-power generation performed as the oxygen-consumption electric-power generation is based on variable electric-power generation in the second embodiment so that the net output W3 is controlled to zero, a negative value, or a positive value in accordance with the electric-power generating mode. Specifically, a voltage for the fuel cell 1 that allows for a desired net output W3 is calculated, and the rotation speeds of the cathode circulation pump 14 and the compressor 7 are adjusted in the aforementioned direction so that the calculated voltage is achieved.

Next, the routine proceeds from step S203 to step S204 where it is determined whether or not the oxygen-consumption electric-power generation has been completed. Since this determination method is the same as that in step S108 in the first embodiment, a description thereof will be omitted here.

If the determination result in step S204 indicates "NO", the routine returns to step S203 so as to continue with the oxygen-consumption electric-power generation.

If the determination result in step S204 indicates "YES", the routine proceeds to step S205 where a process for stopping the electric-power generation in the fuel cell 1 is performed, and the routine ends. Since the process for stopping the electric-power generation in the fuel cell 1 is the same as the process in step S109 in the first embodiment, a description thereof will be omitted here.

On the other hand, if the determination result in step S202 indicates "NO" (SOC<A), the routine proceeds to step S206 where off-state charging is performed. Since the off-state charging is the same as the process in step S110 in the first embodiment, a description thereof will be omitted there.

Subsequently, the routine proceeds to step S207 where it is determined whether or not the SOC in the high-voltage battery 41 is larger than or equal to a predetermined value C. The predetermined value C is a value slightly smaller than the predetermined value A (C<A).

If the determination result in step S207 indicates "NO" (SOC<C), the routine returns to step S206 so as to continue with the off-state charging.

If the determination result in step S207 indicates "YES" (SOC≥C), the routine proceeds to step S208 where preparation for oxygen-consumption electric-power generation is performed while the off-state charging is continuously performed. Since the preparation for oxygen-consumption electric-power generation is the same as the preparation for oxygen-consumption electric-power generation in step S112 in the first embodiment, a description thereof will be omitted here.

The routine proceeds from step S208 to step S209 where it is determined whether or not the SOC in the high-voltage battery 41 is larger than or equal to the predetermined value A.

If the determination result in step S209 indicates "NO" (SOC<A), the routine returns to step S208.

If the determination result in step S209 indicates "YES" (SOC≥A), the routine proceeds to step S210 where the off-state charging ends.

Subsequently, the routine proceeds from step S210 to step S211 where cathode circulation electric-power generation is performed as oxygen-consumption electric-power generation. In this case, the cathode circulation electric-power generation performed as the oxygen-consumption electric-power generation is the same as the cathode circulation electric-power generation in step S107 in the first embodiment. Specifically, the cathode circulation electric-power generation in step S211 is performed such that the net output W3 of the fuel cell 1 constantly becomes a positive value.

The routine proceeds from step S211 to step S212 where it is determined whether or not the oxygen-consumption electric-power generation has been completed. Since this determination method is the same as that in step S204, a description thereof will be omitted here.

If the determination result in step S212 indicates "NO", the routine returns to step S211 so as to continue with the oxygen-consumption electric-power generation.

If the determination result in step S212 indicates "YES", the routine proceeds to step S205 where the process for stopping the electric-power generation in the fuel cell 1 is performed, and the routine ends.

Figure 8:
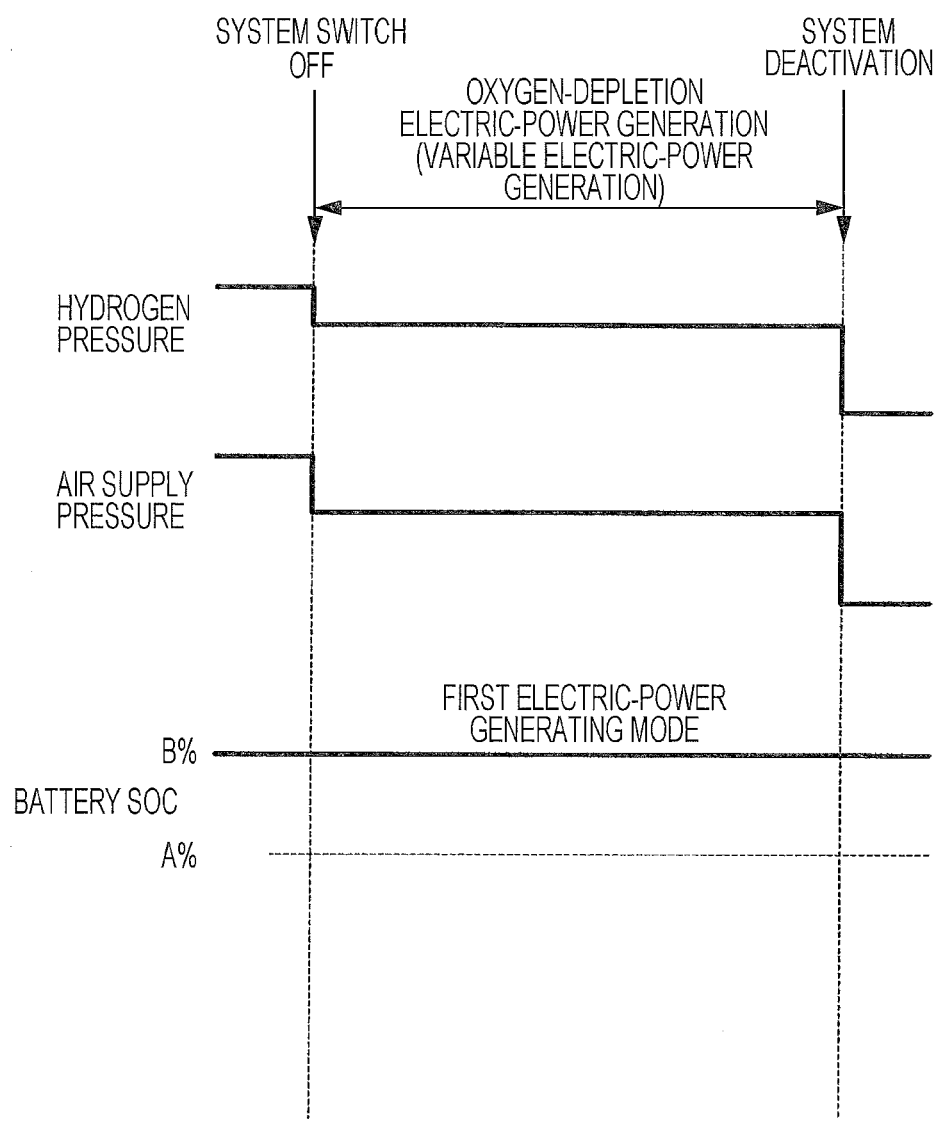
FIG. 8 is a timing chart for the SOC in the battery when the fuel-cell-system deactivation control according to the second embodiment is performed in a state where the SOC in the battery is equal to the upper limit value B.

FIG. 8 is a timing chart from when the system switch 31 is turned off to when the system is deactivated (i.e., electric-power generation in the fuel cell 1 is stopped) in a case where the SOC in the high-voltage battery 41 is equal to the upper limit value B (i.e., when the determination result in step S202 indicates "YES"), and illustrates a case where the variable electric-power generation based on which the cathode circulation electric-power generation is performed as the oxygen-consumption electric-power generation in step S203 is performed in the first electric-power generating mode. In this case, since the net output W3 of the fuel cell 1 is zero during the oxygen-consumption electric-power generation, the high-voltage battery 41 does not discharge electricity therefrom or is not charged with electricity. Therefore, in this case, the SOC in the high-voltage battery 41 is maintained at the upper limit value B until the oxygen-consumption electric-power generation is completed. Upon completion of the oxygen-consumption electric-power generation, the oxygen concentration within the cathode system of the fuel cell 1 is reduced to a predetermined value and the interior of the cathode system is in a nitrogen-rich state.

Figure 9:
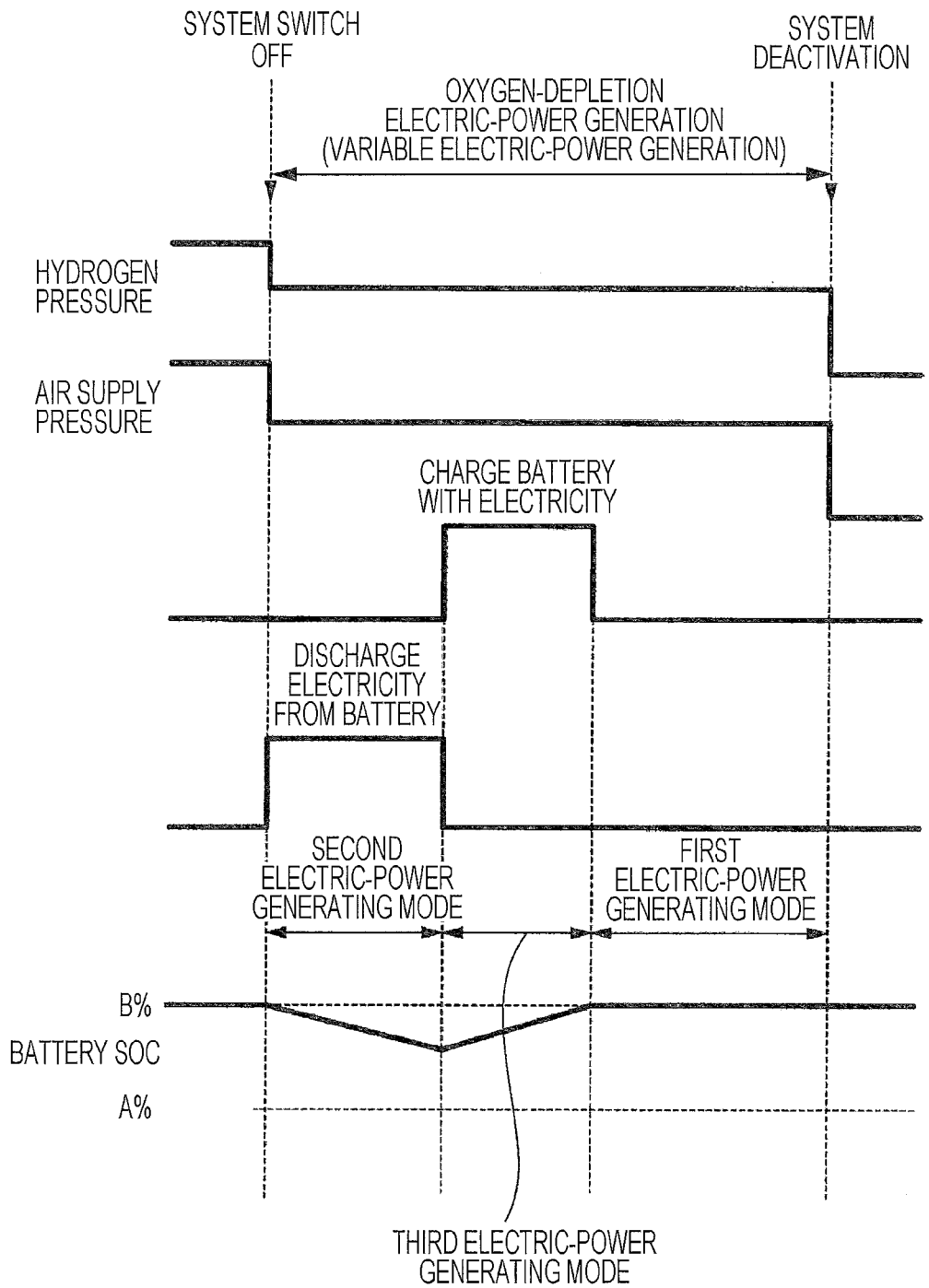
FIG. 9 is another timing chart for the SOC in the battery when the fuel-cell-system deactivation control according to the second embodiment is performed in a state where the SOC in the battery is equal to the upper limit value B.

FIG. 9 is a timing chart from when the system switch 31 is turned off to when the system is deactivated in a case where the SOC in the high-voltage battery 41 is equal to the upper limit value B (i.e., when the determination result in step S202 indicates "YES"), and illustrates a case where the variable electric-power generation based on which the cathode circulation electric-power generation is performed as the oxygen-consumption electric-power generation in step S203 is performed in the second electric-power generating mode, the third electric-power generating mode, and the first electric-power generating mode.

In the case where the system switch 31 is turned off when the SOC in the high-voltage battery 41 is equal to the upper limit value B, it is preferable that the SOC in the high-voltage battery 41 be maintained at the upper limit value B as in the timing chart shown in FIG. 8 by performing the oxygen-consumption electric-power generation in the first electric-power generating mode. However, there may sometimes be a case where a zero net output W3 in the fuel cell 1 cannot be obtained due to variations in the output from the fuel cell 1 or input of disturbance.

FIG. 9 is a timing chart showing an example of such a case, and illustrates a case where the second electric-power generating mode, in which the net output W3 becomes a negative value, is performed as a result of an effect of, for example, disturbance at the time of commencement of oxygen-consumption electric-power generation. During the second electric-power generating mode, the SOC in the high-voltage battery 41 gradually decreases due to discharging of electricity therefrom. Subsequently, the mode is switched from the second electric-power generating mode to the third electric-power generating mode so that the net output W3 of the fuel cell 1 changes to a positive value. During the third electric-power generating mode, the high-voltage battery 41 is charged with electricity so that the SOC in the high-voltage battery 41 gradually increases. When the SOC in the high-voltage battery 41 reaches the upper limit value B, the mode is switched to the first electric-power generating mode so that the net output W3 of the fuel cell 1 becomes zero. The SOC in the high-voltage battery 41 is maintained at the upper limit value B until the oxygen-consumption electric-power generation is completed. Upon completion of the oxygen-consumption electric-power generation, the oxygen concentration within the cathode system of the fuel cell 1 is reduced to a predetermined value and the interior of the cathode system is in a nitrogen-rich state.

Figure 10:
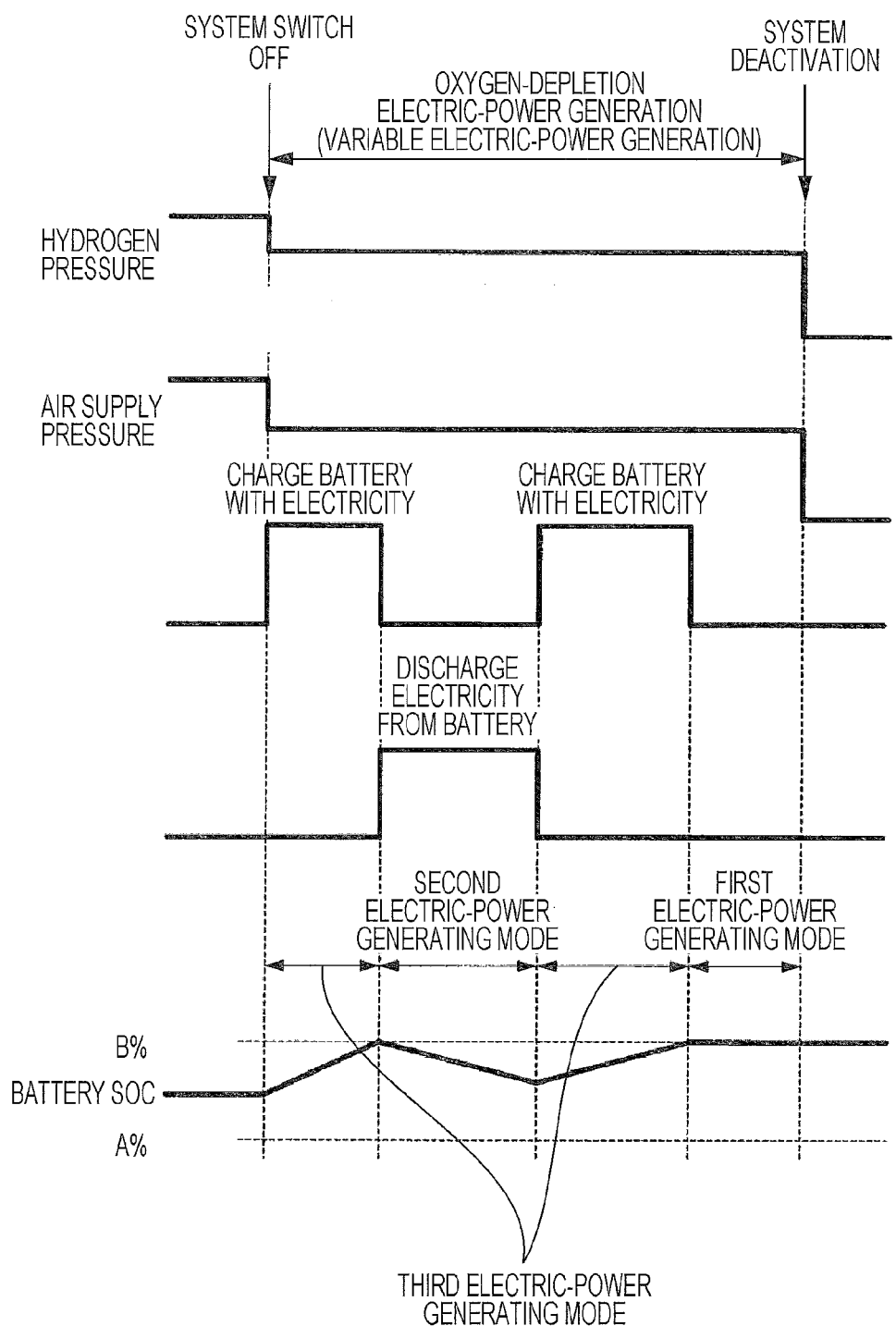
FIG. 10 is a timing chart for the SOC in the battery when the fuel-cell-system deactivation control according to the second embodiment is performed in a state where the SOC in the battery is smaller than the upper limit value B but larger than or equal to the predetermined value A.

FIG. 10 is a timing chart from when the system switch 31 is turned off to when the system is deactivated in a case where the SOC in the high-voltage battery 41 is smaller than the upper limit value B but larger than the predetermined value A (i.e., when the determination result in step S202 indicates "YES").

When oxygen-consumption electric-power generation commences, the third electric-power generating mode is performed. During the third electric-power generating mode, the high-voltage battery 41 is charged with electricity so that the SOC in the high-voltage battery 41 gradually increases. When the SOC in the high-voltage battery 41 becomes close to the upper limit value B, the second electric-power generating mode, in which the net output W3 becomes a negative value, is performed as a result of an effect of, for example, disturbance. During the second electric-power generating mode, the SOC in the high-voltage battery 41 gradually decreases due to discharging of electricity therefrom. Subsequently, the mode is switched from the second electric-power generating mode to the third electric-power generating mode so that the net output W3 of the fuel cell 1 changes to a positive value. During the third electric-power generating mode, the high-voltage battery 41 is charged with electricity so that the SOC in the high-voltage battery 41 gradually increases. When the SOC in the high-voltage battery 41 reaches the upper limit value B, the mode is switched to the first electric-power generating mode so that the net output W3 of the fuel cell 1 becomes zero. The SOC in the high-voltage battery 41 is maintained at the upper limit value B until the oxygen-consumption electric-power generation is completed. Upon completion of the oxygen-consumption electric-power generation, the oxygen concentration within the cathode system of the fuel cell 1 is reduced to a predetermined value and the interior of the cathode system is in a nitrogen-rich state.

In the method for deactivating the fuel cell system according to the second embodiment, if the SOC in the high-voltage battery 41 is larger than or equal to the predetermined value A when the system switch 31 is turned off, oxygen-consumption electric-power generation is performed based on variable electric-power generation so that the oxygen concentration within the cathode system of the fuel cell 1 can be sufficiently reduced by the time the oxygen-consumption electric-power generation is completed. As a result, the electric-power generation in the fuel cell 1 can be stopped in a state where the oxygen concentration within the cathode system has been sufficiently reduced. Therefore, the cathode 4 can be reliably prevented from being in a high potential state at the time of subsequent activation of the fuel cell system. Consequently, deterioration of the solid polymer electrolyte membrane 2 of the fuel cell 1 can be prevented.

Furthermore, by performing the variable electric-power generation, the balance of the SOC in the high-voltage battery 41 can be adjusted, thereby absorbing variations in the net output W3 of the fuel cell 1 and disturbance during the oxygen-consumption electric-power generation.

Since the oxygen-consumption electric-power generation is performed based on variable electric-power generation in the second embodiment, a preprocess for adjusting the state of charge in the electricity storage unit prior to the oxygen-consumption electric-power generation is not necessary, whereby the time required for the process for deactivating the fuel cell system can be shortened.

Furthermore, the oxygen-consumption electric-power generation can be properly completed without wasteful operation of the auxiliary device 42 that originally does not need to be actuated but consumes electric power solely for reducing the SOC in the high-voltage battery 41. Thus, a sense of discomfort felt by the user due to unnecessary actuation of the auxiliary device 42, deterioration in the durability of the auxiliary device 42 caused by an increased operating time, misoperation of the fuel cell system caused by unexpected actuation of the auxiliary device 42, and the like can be suppressed.

If there is a device that is not directly involved with the electric-power generation in the fuel cell 1 but is to be driven when the variable electric-power generation is being performed, the operation of such a device is not hindered. By supplying electric power to the device from the high-voltage battery 41, the SOC in the high-voltage battery 41 can be quickly reduced to the predetermined value A.

Furthermore, since the SOC in the high-voltage battery 41 can be set to the upper limit value B that is larger than the predetermined value A upon completion of the oxygen-consumption electric-power generation, the electric power required for subsequent activation of the fuel cell system can be sufficiently ensured.

Other Embodiments

The present application is not limited to the embodiments described above.

For example, the electricity storage unit is not limited to a battery and may alternatively be a capacitor.

The components in the above embodiments and combinations thereof are examples. Addition, omission, replacement, and alteration of components are permissible within the scope of the present application.

A first aspect of the embodiment provides a method for deactivating a fuel cell system including a fuel cell (e.g. a fuel cell 1 in embodiments to be described below) having an anode (e.g. an anode 3 in embodiments to be described below) and a cathode (e.g. a cathode 4 in embodiments to be described below) and performing electric-power generation by being supplied with fuel gas (e.g. hydrogen in embodiments to be described below) to the anode and oxidant gas (e.g. air in embodiments to be described below) to the cathode; an auxiliary device (e.g. a compressor 7, a cathode circulation pump 14, and an auxiliary device 42 in embodiments to be described below) that is actuated for performing the electric-power generation in the fuel cell; an electricity storage unit (e.g. a high-voltage battery 41 in embodiments to be described below) that stores electricity generated in the fuel cell; and a stop switch (e.g. a system switch 31 in embodiments to be described below) that is to be operated when the electric-power generation in the fuel cell is to be stopped. When the stop switch is operated, oxygen-consumption electric-power generation (e.g. cathode circulation electric-power generation in embodiments to be described below) for reducing oxygen concentration within a cathode system of the fuel cell by consuming oxygen remaining in the cathode system is performed, and the electric-power generation in the fuel cell is subsequently stopped. The method includes performing low electric-power generation prior to the oxygen-consumption electric-power generation in a case where a state of charge in the electricity storage unit is larger than a predetermined value (e.g. a predetermined value A in embodiments to be described below) when the stop switch is operated, the low electric-power generation causing a net output to be a negative value, the net output being a value obtained by subtracting a consumed power by the auxiliary device actuated for obtaining an amount of electric power generated by the fuel cell from the amount of electric power generated by the fuel cell; and performing the oxygen-consumption electric-power generation after the state of charge in the electricity storage unit is reduced to the predetermined value by compensating for the negative net output by discharging electricity from the electricity storage unit.

A second aspect of the embodiment provides a method for deactivating a fuel cell system including a fuel cell (e.g. a fuel cell 1 in embodiments to be described below) having an anode (e.g. an anode 3 in embodiments to be described below) and a cathode (e.g. a cathode 4 in embodiments to be described below) and performing electric-power generation by being supplied with fuel gas (e.g. hydrogen in embodiments to be described below) to the anode and oxidant gas (e.g. air in embodiments to be described below) to the cathode; an auxiliary device (e.g. a compressor 7, a cathode circulation pump 14, and an auxiliary device 42 in embodiments to be described below) that is actuated for performing the electric-power generation in the fuel cell; an electricity storage unit (e.g. a high-voltage battery 41 in embodiments to be described below) that stores electricity generated in the fuel cell; and a stop switch (e.g. a system switch 31 in embodiments to be described below) that is to be operated when the electric-power generation in the fuel cell is to be stopped. When the stop switch is operated, oxygen-consumption electric-power generation (e.g. cathode circulation electric-power generation in embodiments to be described below) for reducing oxygen concentration within a cathode system of the fuel cell by consuming oxygen remaining in the cathode system is performed, and the electric-power generation in the fuel cell is subsequently stopped. The method includes performing the oxygen-consumption electric-power generation based on variable electric-power generation in a case where a state of charge in the electricity storage unit is larger than or equal to a first predetermined value (e.g. a predetermined value A in embodiments to be described below) when the stop switch is operated. The variable electric-power generation has three electric-power generating modes including a first electric-power generating mode in which the electric-power generation in the fuel cell is controlled such that a net output becomes zero, a second electric-power generating mode in which the electric-power generation in the fuel cell is controlled such that the net output becomes a negative value, and a third electric-power generating mode in which the electric-power generation in the fuel cell is controlled such that the net output becomes a positive value. The net output is a value obtained by subtracting a consumed power by the auxiliary device actuated for obtaining an amount of electric power generated by the fuel cell from the amount of electric power generated by the fuel cell. The electric-power generation is performed in the first electric-power generating mode alone or in at least two of the three electric-power generating modes so that the oxygen concentration within the cathode system of the fuel cell is reduced by consuming the oxygen remaining in the cathode system.

In the second aspect, the variable electric-power generation may be performed such that the state of charge in the electricity storage unit becomes equal to a second predetermined value (e.g. an upper limit value B in embodiments to be described below) that is larger than the first predetermined value upon completion of the oxygen-consumption electric-power generation.

According to the first aspect, if the state of charge in the electricity storage unit is larger than the predetermined value, oxygen-consumption electric-power generation is performed after reducing the state of charge in the electricity storage unit by performing low electric-power generation. Therefore, before the oxygen concentration within the cathode system of the fuel cell is to be sufficiently reduced by consuming the oxygen remaining in the cathode system by performing oxygen-consumption electric-power generation, the capacity available in the electricity storage unit that is to be charged with electricity can be ensured as free capacity in the electricity storage unit prior to the commencement of oxygen-consumption electric-power generation. As a result, when the oxygen-consumption electric-power generation is performed, the oxygen concentration within the cathode system of the fuel cell can be sufficiently reduced, so that the electric-power generation in the fuel cell can be stopped in a state where the oxygen concentration within the cathode system has been sufficiently reduced. Therefore, the cathode can be reliably prevented from being in a high potential state at the time of subsequent activation of the fuel cell system. Consequently, deterioration of a solid polymer electrolyte membrane of the fuel cell can be prevented.

In addition, the state of charge in the electricity storage unit can be reduced to the predetermined value without wasteful operation of the auxiliary device that originally does not need to be actuated but consumes electric power solely for reducing the state of charge in the electricity storage unit. Thus, a sense of discomfort felt by the user due to unnecessary actuation of the auxiliary device, deterioration in the durability of the auxiliary device caused by an increased operating time, misoperation of the fuel cell system caused by unexpected actuation of the auxiliary device, and the like can be suppressed.

According to the second aspect, if the state of charge in the electricity storage unit is larger than or equal to the first predetermined value, oxygen-consumption electric-power generation is performed based on variable electric-power generation. Thus, the oxygen-consumption electric-power generation can be reliably performed while adjusting the state of charge in the electricity storage unit so that the state of charge does not exceed an upper limit value, and the oxygen concentration within the cathode system of the fuel cell can be sufficiently reduced upon completion of the oxygen-consumption electric-power generation. As a result, the electric-power generation in the fuel cell can be stopped in a state where the oxygen concentration within the cathode system has been sufficiently reduced, so that the cathode can be reliably prevented from being in a high potential state at the time of subsequent activation of the fuel cell system. Consequently, deterioration of a solid polymer electrolyte membrane of the fuel cell can be prevented.

Furthermore, by performing the oxygen-consumption electric-power generation based on variable electric-power generation, the balance of the state of charge in the electricity storage unit can be adjusted, thereby absorbing variations in the output of the fuel cell and disturbance during the oxygen-consumption electric-power generation.

Since the oxygen-consumption electric-power generation is performed based on variable electric-power generation, a preprocess for adjusting the state of charge in the electricity storage unit prior to the oxygen-consumption electric-power generation is not necessary, whereby the time required for the process for deactivating the fuel cell system can be shortened.

Furthermore, the oxygen-consumption electric-power generation can be properly completed without wasteful operation of the auxiliary device that originally does not need to be actuated but consumes electric power solely for reducing the state of charge in the electricity storage unit. Thus, a sense of discomfort felt by the user due to unnecessary actuation of the auxiliary device, deterioration in the durability of the auxiliary device caused by an increased operating time, misoperation of the fuel cell system caused by unexpected actuation of the auxiliary device, and the like can be suppressed.

Performing the variable electric-power generation in at least two of the first to third electric-power generating modes implies that the state of charge in the electricity storage unit can be set to a desired value by various combinations of electric-power generating modes shown below as examples.

(1) Third Electric-Power Generating Mode→First Electric-Power Generating Mode (2) Second Electric-Power Generating Mode→Third Electric-Power Generating Mode (3) Second Electric-Power Generating Mode→Third Electric-Power Generating Mode→First Electric-Power Generating Mode (4) Second Electric-Power Generating Mode→Third Electric-Power Generating Mode→Second Electric-Power Generating Mode→Third Electric-Power Generating Mode→(Repeat)→First Electric-Power Generating Mode (5) Third Electric-Power Generating Mode→Second Electric-Power Generating Mode→Third Electric-Power Generating Mode→Second Electric-Power Generating Mode→(Repeat)→First Electric-Power Generating Mode In the second aspect, since the state of charge in the electricity storage unit can be set to the second predetermined value that is larger than the first predetermined value upon completion of the oxygen-consumption electric-power generation, the electric power required for subsequent activation of the fuel cell system can be sufficiently ensured.

Obviously, numerous modifications and variations of the present invention are possible in light of the above teachings. It is therefore to be understood that within the scope of the appended claims, the invention may be practiced otherwise than as specifically described herein.

What is claimed is:

1. A method for deactivating a fuel cell system, the method comprising:
    performing low electric-power generation prior to oxygen-consumption electric-power generation in a case where a state of charge in an electricity storage device provided in the fuel cell system is larger than a predetermined value when a stop switch provided in the fuel cell system is operated, the electricity storage device being provided to store electricity generated in a fuel cell provided in the fuel cell system, the stop switch being provided to be operated when electric-power generation in the fuel cell is to be stopped, the low electric-power generation causing a net output to be a negative value, the net output comprising a value obtained by subtracting a power consumption of an auxiliary device actuated to obtain an amount of electric power generated by the fuel cell from the amount of electric power generated by the fuel cell, the state of charge in the electricity storage device being reduced to the predetermined value by compensating for a negative net output by discharging electricity from the electricity storage device; and
    performing the oxygen-consumption electric-power generation in which oxygen remaining in a cathode system of the fuel cell is consumed to reduce oxygen concentration within the cathode system.

2. A fuel cell system comprising:
    a fuel cell having an anode and a cathode, the fuel cell being provided to perform electric-power generation by being supplied with fuel gas to the anode and oxidant gas to the cathode;
    an auxiliary device provided to be actuated to perform the electric-power generation in the fuel cell;
    an electricity storage device provided to store electricity generated in the fuel cell;
    a stop switch provided to be operated when the electric-power generation in the fuel cell is to be stopped; and
    a controller configured to perform low electric-power generation prior to oxygen-consumption electric-power generation in a case where a state of charge in the electricity storage device is larger than a predetermined value when the stop switch is operated, the low electric-power generation causing a net output to be a negative value, the net output comprising a value obtained by subtracting a power consumption of the auxiliary device actuated to obtain an amount of electric power generated by the fuel cell from the amount of electric power generated by the fuel cell, the controller being configured to perform, after the state of charge in the electricity storage device is reduced to the predetermined value by compensating for a negative net output by discharging electricity from the electricity storage device, the oxygen-consumption electric-power generation in which oxygen remaining in a cathode system of the fuel cell is consumed to reduce oxygen concentration within the cathode system.

3. The method according to claim 1, further comprising:
    determining whether the state of charge in the electricity storage device is larger than the predetermined value when the stop switch is operated, prior to performing the low electric-power generation.

4. The method according to claim 3, wherein the performing low electric-power generation is performed when the state of charge in the electricity storage device is determined to be larger than the predetermined value when the stop switch is operated.

5. A method for deactivating a fuel cell system, the fuel cell system having:
    a fuel cell having a cathode system;
    an electricity storage device to store electricity generated in the fuel cell;
    a stop switch operated when electric-power generation in the fuel cell is to be stopped; and
    an auxiliary device actuated to obtain an amount of electric power generated by the fuel cell,
    the method comprising:
    performing low electric-power generation prior to oxygen-consumption electric-power generation when a state of charge in the electricity storage device is larger than a predetermined value when the stop switch is operated, the low electric-power generation causing a net output to be a negative value, the net output comprising a value obtained by subtracting a power consumption of the auxiliary device from the amount of electric power generated by the fuel cell, the state of charge in the electricity storage device being reduced to the predetermined value by compensating for a negative net output by discharging electricity from the electricity storage device; and
    performing the oxygen-consumption electric-power generation in which oxygen remaining in the cathode system is consumed to reduce oxygen concentration within the cathode system.

6. The method according to claim 5, further comprising:
    determining whether the state of charge in the electricity storage device is larger than the predetermined value when the stop switch is operated, prior to performing the low electric-power generation.

7. The method according to claim 6, wherein the performing low electric-power generation is performed when the state of charge in the electricity storage device is determined to be larger than the predetermined value when the stop switch is operated.

* * * * *